US008458441B2

(12) United States Patent
Ismert et al.

(10) Patent No.: US 8,458,441 B2
(45) Date of Patent: Jun. 4, 2013

(54) VECTOR EXTENSIONS TO AN INTERPRETED GENERAL EXPRESSION EVALUATOR IN A DATABASE SYSTEM

(75) Inventors: Erik Ismert, Shoreline, WA (US); Frank Huber, Berlin (DE)

(73) Assignee: Microsoft Corporation, Redmond, WA (US)

( * ) Notice: Subject to any disclaimer, the term of this patent is extended or adjusted under 35 U.S.C. 154(b) by 1055 days.

(21) Appl. No.: 12/465,656

(22) Filed: May 14, 2009

(65) Prior Publication Data

US 2010/0293177 A1 Nov. 18, 2010

(51) Int. Cl.
*G06F 9/00* (2006.01)
(52) U.S. Cl.
USPC .......................................................... 712/202
(58) Field of Classification Search
None
See application file for complete search history.

(56) References Cited

U.S. PATENT DOCUMENTS

| | | | |
|---|---|---|---|
| 4,870,568 A | 9/1989 | Kahle et al. | |
| 5,548,769 A | 8/1996 | Baum et al. | |
| 5,761,523 A | 6/1998 | Wilkinson et al. | |
| 5,978,577 A * | 11/1999 | Rierden et al. | 1/1 |
| 6,341,277 B1 * | 1/2002 | Coden et al. | 707/718 |
| 7,437,666 B2 * | 10/2008 | Ramarao et al. | 715/235 |
| 7,461,370 B2 * | 12/2008 | Wyschogrod et al. | 717/144 |
| 7,743,069 B2 * | 6/2010 | Chitkara et al. | 707/781 |
| 8,065,288 B1 * | 11/2011 | Garland et al. | 707/706 |
| 2004/0054879 A1 * | 3/2004 | Macy et al. | 712/221 |
| 2007/0055656 A1 * | 3/2007 | Tunstall-Pedoe | 707/3 |
| 2007/0265825 A1 * | 11/2007 | Cancedda et al. | 704/2 |
| 2008/0034186 A1 | 2/2008 | Stuttard et al. | |

OTHER PUBLICATIONS

Zhou, et al."Implementing Database Operations Using SIMD Instructions", Retrieved at<<http://www.cs.columbia.edu/~kar/pubsk/simd.pdf>>, ACM SIGMOD 'Jun. 4-6, 2002, Madison, Wisconsin, USA, pp. 12.
Martin Rich,"A Vectorized Hash-Join", Retrieved at<<http://www.cag.lcs.mit.edu/6.893-f2000/vectorhashjoin.pdf>>, pp. 17, May 11, 1996.
Farrar Michael, "Striped Smith—Waterman Speeds Database Searches Six Times over Other SIMD Implementations", Retrieved at<<http://bioinformatics.oxfordjournals.org/cgi/reprint/23/2/156>>, vol. 23 No. 2 2007, Published Nov. 16, 2006, pp. 6.
Hillis, et al."Data Parallel Algorithms", Retrieved at<<http://cva.stanford.edu/classes/cs99s/papers/hillis-steele-data-parallel-algorithms.pdf>>, ACM, Dec. 1986, vol. 29, pp. 1170-1183.

(Continued)

*Primary Examiner* — Eric Coleman
(74) *Attorney, Agent, or Firm* — Gonzalez Saggio & Harlan LLP

(57) ABSTRACT

The subject disclosure is directed towards technology by which an expression in a database engine is executed against stacks of data. Each instruction of the expression is evaluated against the data stacks until completed against each data stack, such as by iterating to execute an instruction through the data stacks before executing the next instruction. The data may be arranged in the data stacks (in memory) in various ways, such as to have each data stack contain the data of one database row, (e.g., with the data stack elements comprising column data. Data may be grouped, such as to put the data from different rows into the same data stack.

20 Claims, 6 Drawing Sheets

OTHER PUBLICATIONS

Mueller, et al."Expression and Loop Libraries for High-Performance Code Synthesis", Retrieved at<<http://www.corepy.org/pdfs/syn-expr-chris-mueller.pdf>>, pp. 15, 2007.

"MtxVec v3", Retrieved at<<http://www.dewresearch.com/mtxvec2.html>>, pp. 3, Jan. 24, 2009.

Rao, et al."Power-Pipelining for Enhanced Query Performance", Retrieved at<<http://www1.cs.columbia.edu/~library/TR-repository/reports/reports-2000/cucs-007-00.pdf>>, Columbia University Technical Report CUCS-007-00, May. 19, 2000, pp. 19.

Boncz, et al."MonetDB/X100: Hyper-Pipelining Query Execution", Retrieved at<<http://www-db.cs.wisc.edu/cidr/cidr2005/papers/P19.pdf>>, Proceedings of the 2005 CIDR Conference, pp. 13, 2005.

* cited by examiner

VECTOR EXTENSIONS TO AN INTERPRETED GENERAL EXPRESSION EVALUATOR IN A DATABASE SYSTEM

BACKGROUND

In a database system, an expression service including a general software interpreted expression engine processes expressions within queries. Such expression engines are stack based, and use function pointers to allow arbitrary user expressions to be executed through the same framework. For example, in SQL Server's expression engine, a single data stack (typically corresponding to one row of data) and a sequence of function pointers that represent the general steps ('instructions') that a particular expression needs to run are maintained. Each function call takes the data stack, operates on it as necessary (reads and/or writes), and then returns. When the entire expression is done, the last data value on the stack is the result.

In many situations where the engine runs the same expression against a large set of data, the expression evaluation service sets up the data stack for a single row, for example, runs through the steps of that expression, and when finished, repeats for the next row. The overhead of setting up the stack as well as each step to be executed costs processor instructions. Any technology that provides the same results while using a reduced number of processor instructions is desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards executing expressions in a database engine against stacks of data. In one aspect, instructions of the expression are executed against the data stacks until completed against each data stack. For any given data stack, the first instruction completes execution before the second instruction executes against that data stack. This may include having the first instruction complete execution against all data stacks before the second instruction executes against any data stack, such as by iterating to execute the first instruction through the data stacks before executing the second instruction.

Data corresponding to the number of data stacks may be passed as a parameter to an expression evaluation service/engine. Data corresponding to the source of the data (e.g., pointers to a database) may be likewise provided so that the data can be loaded into the data stacks. The data may be arranged in the data stacks (in memory) in various ways. For example, each data stack may have the data of one database row, with the elements within that data stack comprising data from at least some of the columns of that database row. Alternatively, data may be grouped, such as to put the data from different rows (e.g., corresponding to the same column) into the same data stack.

In one aspect, the instructions may be part of a filtering expression. The data in a data stack corresponds to a row, and after executing the filtering expression against the data stacks, each data stack contains information as to whether that data stack met one or more filtering criteria.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a general, interpreted expression evaluation engine that applies each instruction of the same expression to different sets of data values, before applying the next instruction, where in general, "instruction" refers to an operation within (e.g., a virtual function called by) the expression. The technology allows an expression to call a single instruction function pointer, and have that instruction applied to possibly many sets of data before that instruction is finished and the next instruction applied. As will be understood, this is done with multiple data stacks and a set of multi-data capable expressions, and, for example, may be used anywhere in the relational database management system that a single expression is repeatedly applied to different pieces of data. The technology thus leads to a substantial reduction in the number of processor instructions that need to be executed to accomplish the same result.

While some of the examples herein are directed towards filtering rows, or enhancing multi-row query execution, it is understood that these are only example uses, and that other single-instruction, multiple data-like (SIMD) uses are straightforward to implement. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and programming operations in general.

Figure 1:
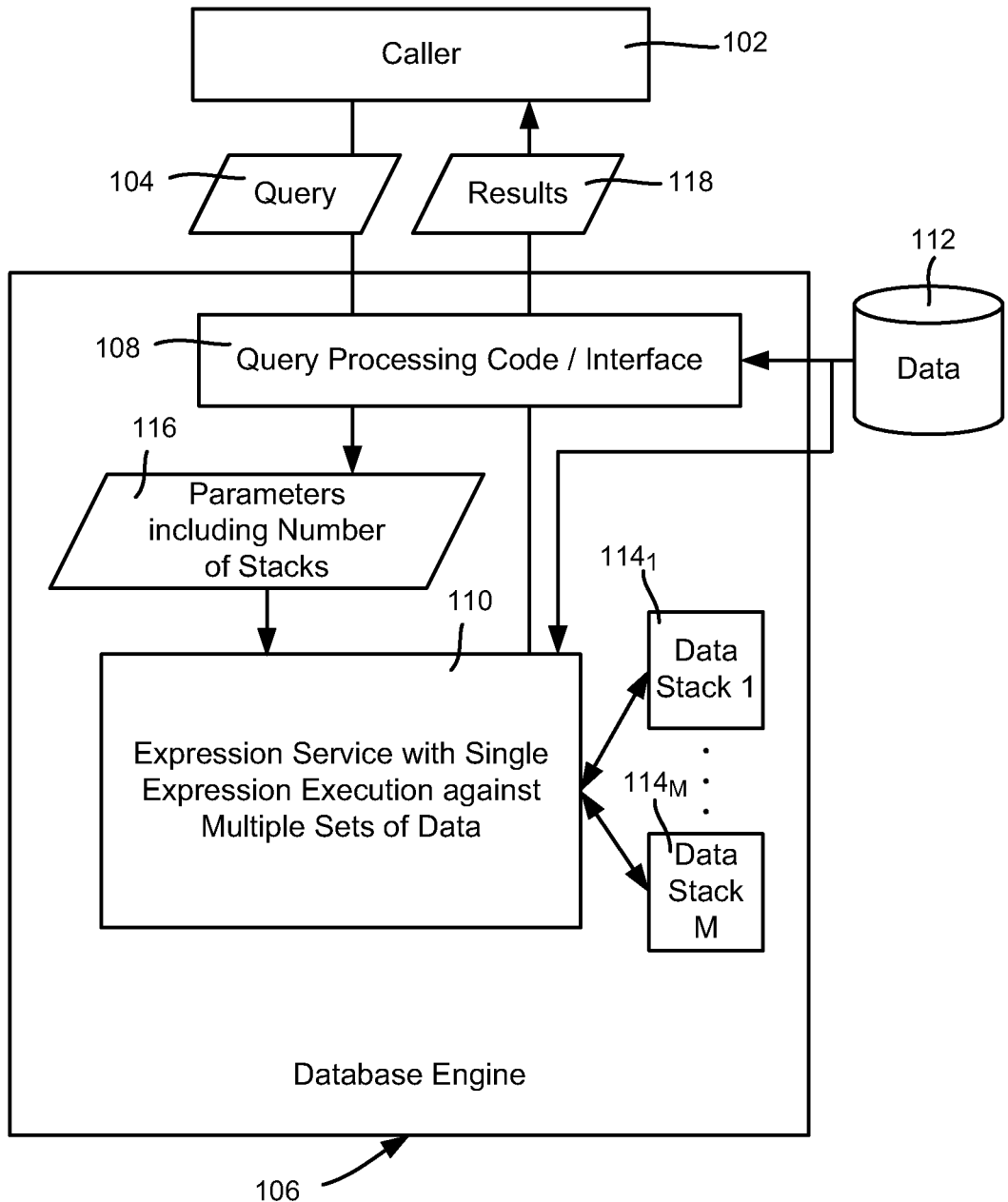
FIG. 1 is a block diagram representing example components in a database environment that executes expression instructions against a plurality of data stacks.

Turning to FIG. 1, there is shown a general block diagram showing a caller 102 (e.g., a SQL program) providing a query 104 to a database engine 106. In general, with respect to processing an expression (or expressions) in the query, query processing code 108 including an interface or the like communicates with an expression service 110. As described below, this communication includes handling one or more instructions to populate appropriate data 112 for that query in multiple data stacks $114_1$-$114_M$ for processing via other instructions corresponding to that expression. For example, each data stack may represent one row of data, with the elements in that data stack representing a select column within that data stack's row.

Unlike prior expression engine technology, the technology described herein facilitates the use of the multiple data stacks $114_1$-$114_M$. To this end, the expression service 110 receives various parameters 116, including a parameter (the value itself or a pointer to a value) that indicates the number of data stacks. Other parameters that may be provided include an array of pointers (or pointer to the array of pointers) that indicates where each row begins in the data 112, to facilitate the handling of variable sized rows. The expression service then executes the instructions against the data in the data stacks $114_1$-$114_M$ as described below, for returning corresponding results 118 to the caller.

Figure 2:
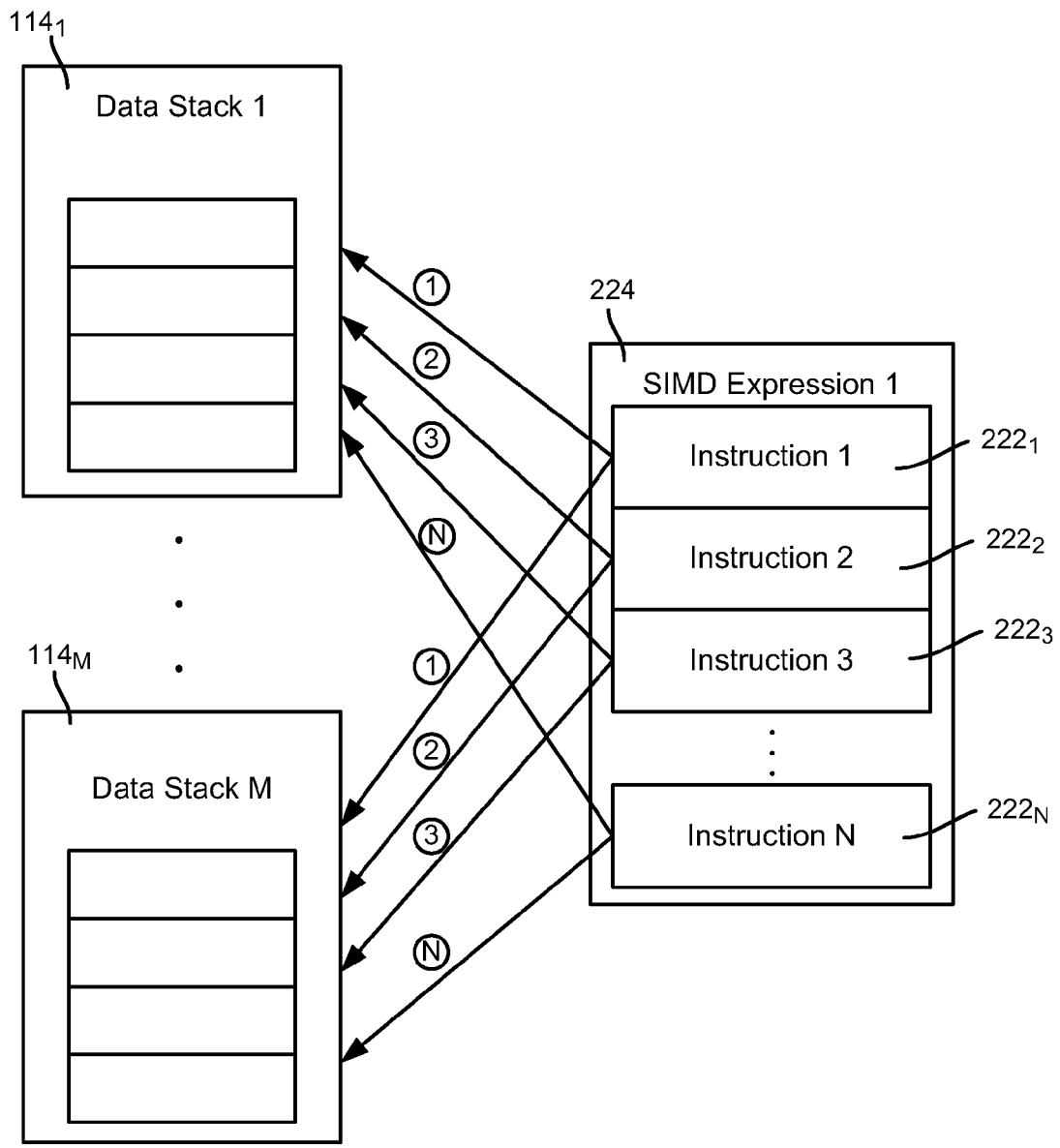
FIG. 2 is a block diagram representing how instructions of an expression are executed against data stacks.

In general, as represented in FIG. 2, a single-instruction, multiple data (SIMD) expression comprises one or more instructions; (Instruction 1 to Instruction N are shown in this example, labeled $222_1$-$222_N$, although as is understood, an expression may include any appropriate number of instructions). Each instruction is applied to each data stack $114_1$-$114_M$, typically finishing its operations before the next instruction is loaded and executed against the data stacks $114_1$-$114_M$. Thus, in the example of FIG. 2, the arrows labeled one (1) represent the first instruction (Instruction 1, or 222) being executed against all data stacks $114_1$-$114_M$, while the arrows labeled two (2) represent the second instruction (Instruction 2, or $222_2$) executed against those data stacks $114_1$-$114_M$, and so on.

To summarize, the expression service 110 (including the engine therein) handles multiple sets of data with a single expression execution. The expression service 110 takes a parameter 116 specifying how big the data set (how many data stacks are present) during this execution. With this information, the multiple data stacks $114_1$-$114_M$ are created (e.g., implemented as an array of these stacks). In one implementation, each data stack mirrors the single data stack previously used (thus allowing the single data execution to be considered a special case of the multiple data execution). Note that it is feasible to have different arrangements of data stack elements in memory, as described below with reference to FIGS. 3 and 4.

FIG. 2 represents the multiple single data stacks being operated on, as if multiple expressions were being executed. To this end, each function pointer (corresponding to one of the instructions $222_1$-$222_N$) that is within the expression 224 is updated to take the size of the data set, and to walk through each of the data stacks $114_1$-$114_M$ and apply its current algorithm to each of them before exiting. As can be seen, although the number of operations being completed is the same, the way in which they are executed is considerably different. The execution of each single instruction operates on the entire set of data before it has completed. Because the stacks are set up only once, and each instruction is only set up once, the execution is more efficient with respect to the total number of processor instructions that the operations take.

By way of an example, consider the use of an SIMD-like expression engine to apply a filter to all of the rows on a page, basically at the same time. A storage engine buffer page may have an 8K page size, whereby it is likely that there is more than a single row on any given page, and indeed, the number is often on the order of tens of rows. Assuming there is a page level lock (for consistency), the expression engine, using an SIMD-like filter expression, runs the expression generally simultaneously on all the data residing on that page.

More particularly, a first instruction (or possibly more than one) may populate the stacks, that is, load one row into each data stack, with select columns of each row loaded into the elements in that row's data stack. Once loaded, a subsequent instruction is executed on all of the data, one stack at a time, to perform the comparison that determines whether each row meets the filtering criteria. When finished, essentially the top of each data stack contains information (e.g., a Boolean bit value) that indicates whether the corresponding row met the filtering criteria. Another instruction may then copy this information to a bitmap or the like that is then processed to return the appropriate rows to the caller. As can be seen, rather than load each row, and run the expression once per row, thus loading many times, the expression is run only once against all of the rows of that page.

Figure 3:
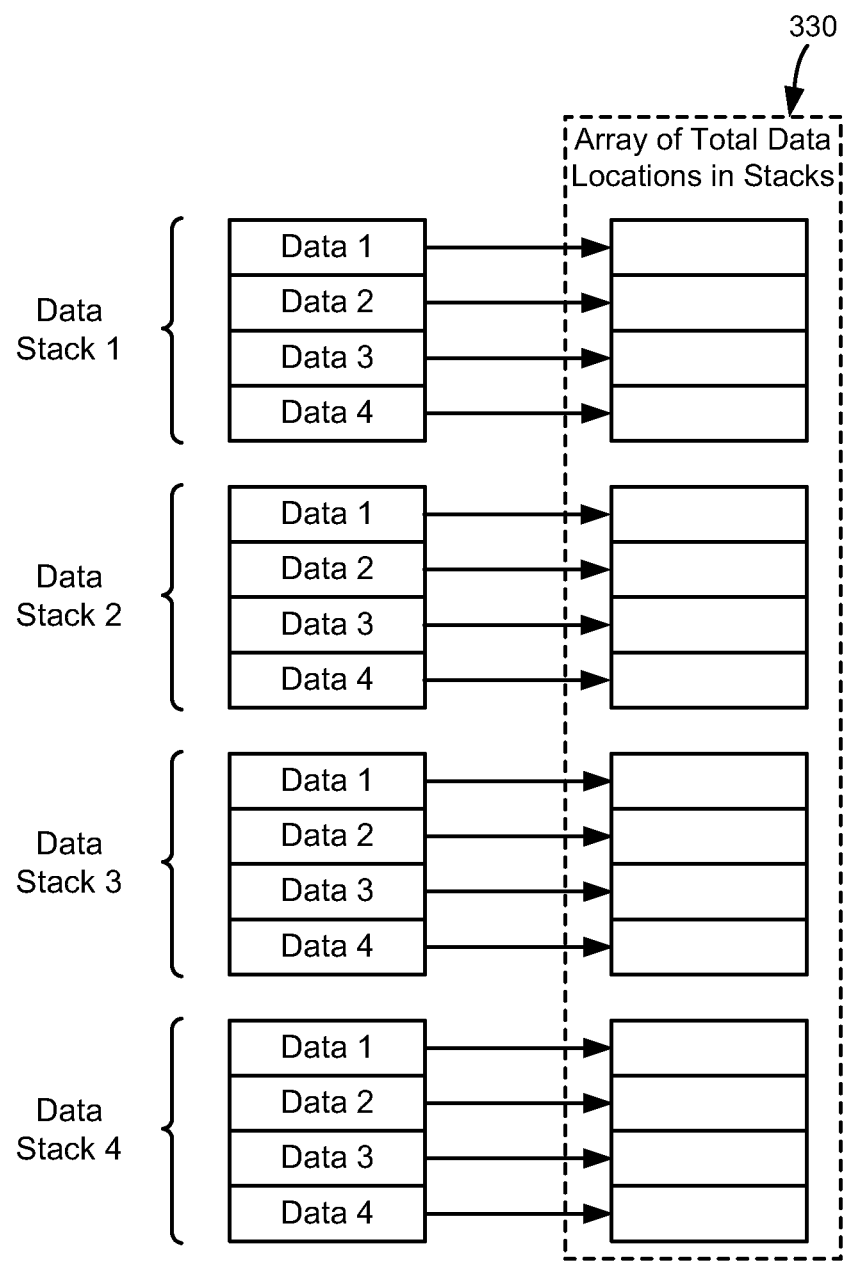
FIG. 3 is a representation of one way to load data from a source database into data stacks arranged in memory.
Figure 4:
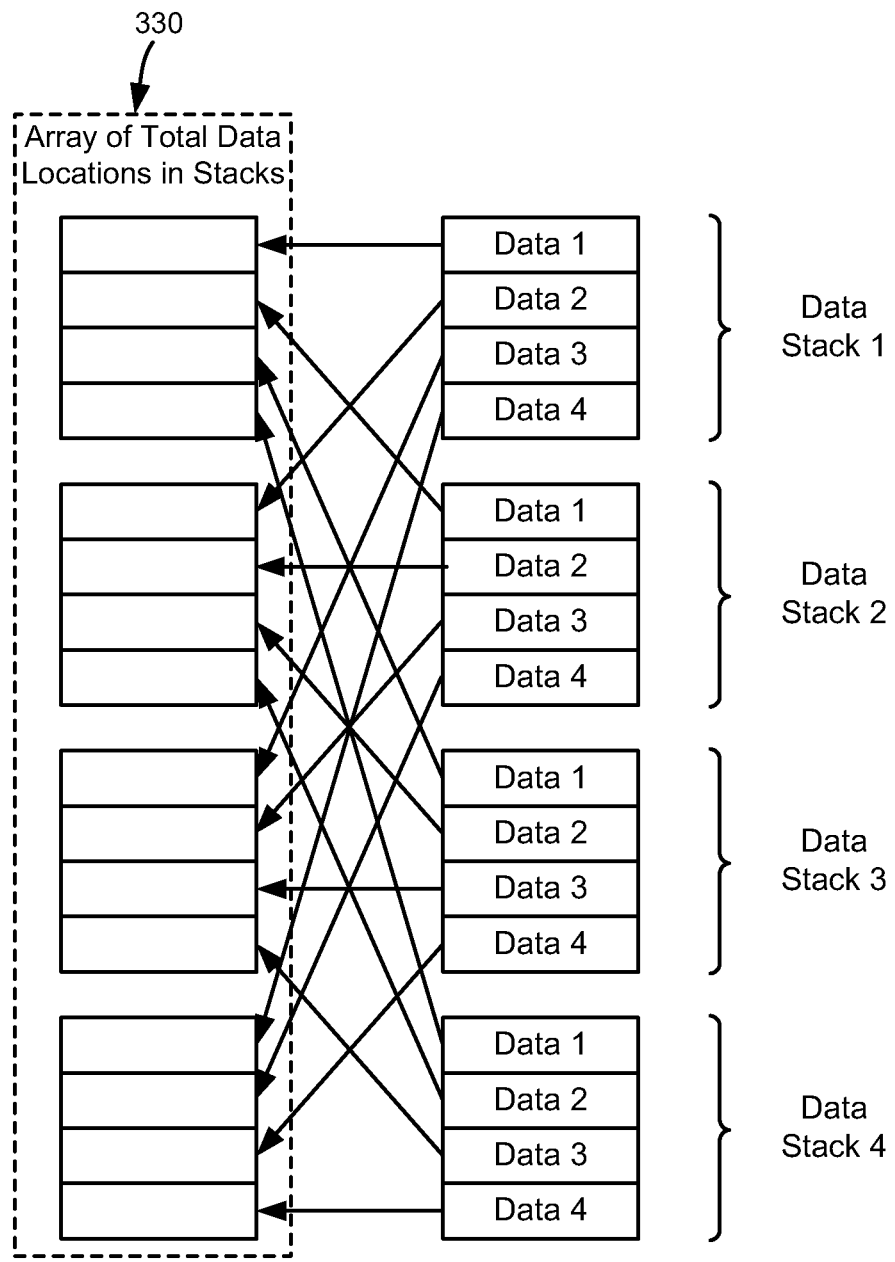
FIG. 4 is a representation of another way to load data from a source database into data stacks arranged in memory.

FIGS. 3 and 4 show various ways in which the data stacks may be populated with data. FIG. 3 shows a vertical (or "true") stack layout, in which the stacks (Data Stack 1 through Data Stack 4 in this example) are arranged one after the other to match the array 330 as arranged in memory. This may be used as described above, e.g., in which the rows are divided among the data stacks with the column data of each row (Data 1 through Data 4 in this example) in the elements of each stack.

In one alternative, FIG. 4 shows a horizontal or grouped data layout, in which the stacks (Data Stack 1 through Data Stack 4 in this example) are divided in memory into a grouped arrangement. For example, given four rows and four columns, the grouped arrangement in FIG. 4 has the "Data 1s" of each data stack adjacent in the memory array 330, the "Data 2s" of each data stack adjacent in the memory array 330, and so forth. As can be readily appreciated, the other arrangements in memory are feasible, and may be used depending on circumstances, such as to facilitate more efficient memory access for a given application and/or type of data.

For example, the data layout of FIG. 4 may take advantage of processor SIMD (e.g., SSE) instructions, (comprising a class of vector instructions on processors that use such data layouts to work efficiently). More particularly, a more targeted data layout with the data stacks aligned differently may allow the expression engine to take advantage of SSE and other vectorized instructions. To use SSE instructions, the memory passed to it needs to be contiguous. Thus, as in FIG. 4, the Data 1 values from the stacks need to be next to each other in memory, as do the Data 2 stacks, and so on. Then a single pointer can be passed to the SSE instructions, giving them access to all the Data 1 values at once (or as many values as the SSE instructions take at a time).

The SIMD-like expression evaluation further facilitates the use of SSE instructions to execute pieces of expressions more efficiently than is presently done. Many arithmetic operations are supported by SSE, as are bit operations. The expression engine may add specific instructions into the SIMD-like expressions to perform SSE operations when possible, and continue running generalized expressions otherwise.

Figure 5:
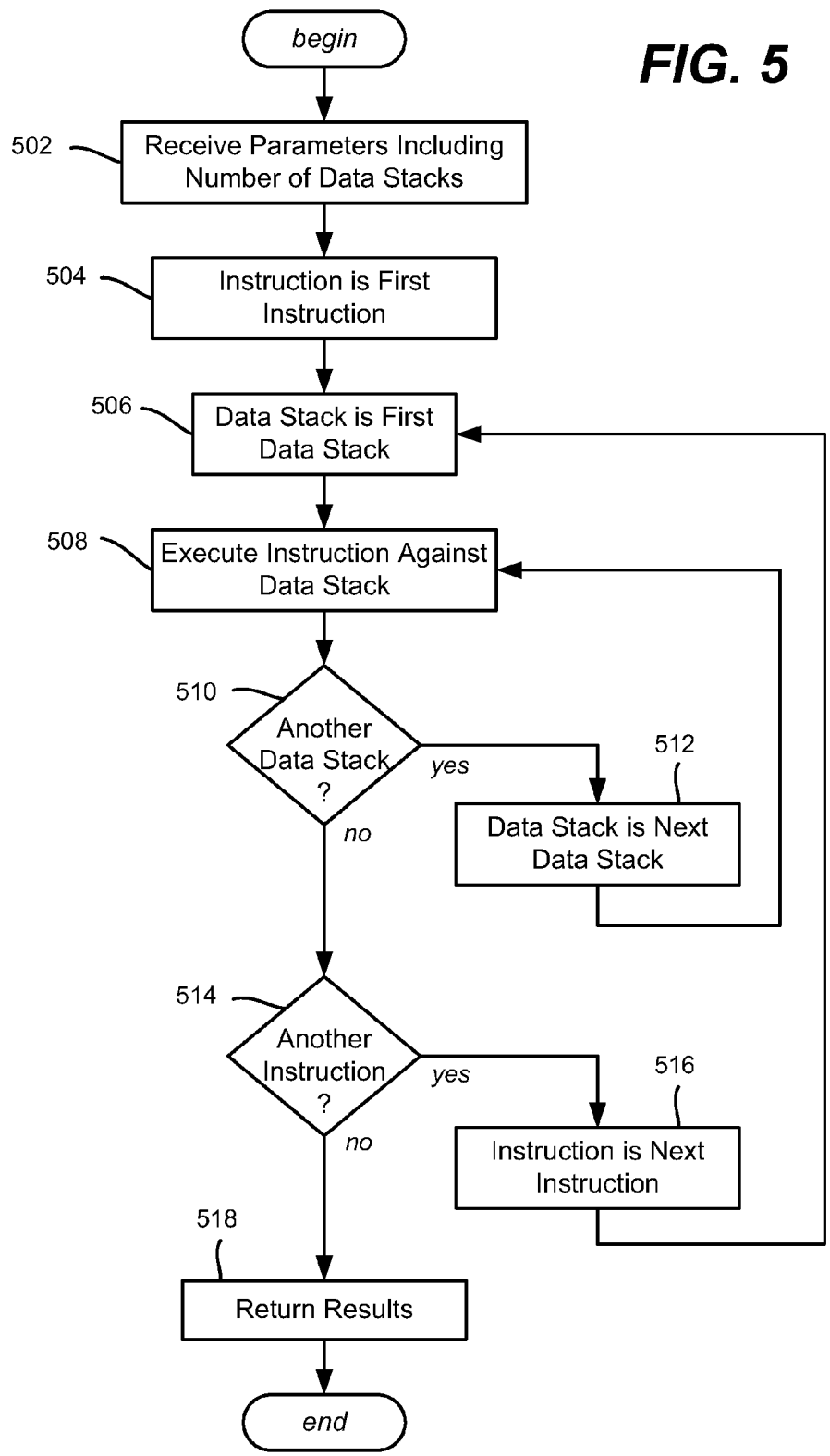
FIG. 5 is a flow diagram representing example steps that may be taken to execute instructions against data stacks.

FIG. 5 provides example logic that may be used to process multiple sets of data with a single expression having SIMD-like instructions therein. Step 502 represents receiving the parameters as described above, which includes information corresponding to the number of data stacks. Step 504 loads the first instruction, and step 506 points to the first data stack.

Step 508 executes the instruction. As described above, this may be to load data into the data stack, to evaluate data in the stack, and so forth, depending on what the current instruction of this expression does.

Steps 510 and 512 repeat the execution of the same instruction on the next data stack, iterating through all of the data stacks. Note that data stacks are fixed in size, and thus a simple offset may be used to determine the location of each data stack. When no more data stacks remain, step 510 branches to step 514, which along with step 516 loads the next instruction for execution. This process loops back until all instructions have completed against all data stacks. Step 518 represents returning (e.g., copying the results of each data stack to a given memory location) the results to the caller.

It should be noted that mechanisms other than looping may be used to track execution of the instructions against the data stacks. For example, a flag or the like may be set when an instruction is done with a data stack. In this way, two or more instructions can run in parallel, e.g., one instruction can be loading a further data stack while another instruction processes a previously-loaded one once its associated flag is set.

As can be readily appreciated, multiple-data expressions are able to enhance multi-row query execution to operate on multiple rows at a time. The technology described herein does so in a way that maintains the full range of flexible operations that present expression engines support, yet in a multi-row based query execution model, Thus, there is described a software implementation of single-instruction, multiple data (SIMD)-like instructions, implemented in a general interpreted expression evaluation engine. These SIMD-like expressions along with the logic in the expression service/evaluation engine may be used for numerous, efficient applications, including filtering the data on a single database page with a single expression. These SIMD-like expressions may be used as are conventional database expressions, providing a simple extension to multi-row query execution implementations, without sacrificing generality. Moreover, with a deliberate (e.g., grouped) data layout, the expression may be able to use true hardware SIMD (e.g., SSE) instructions to evaluate pieces of these general expressions where appropriate and possible, while still being able to provide full expression generality.

Exemplary Operating Environment

Figure 6:
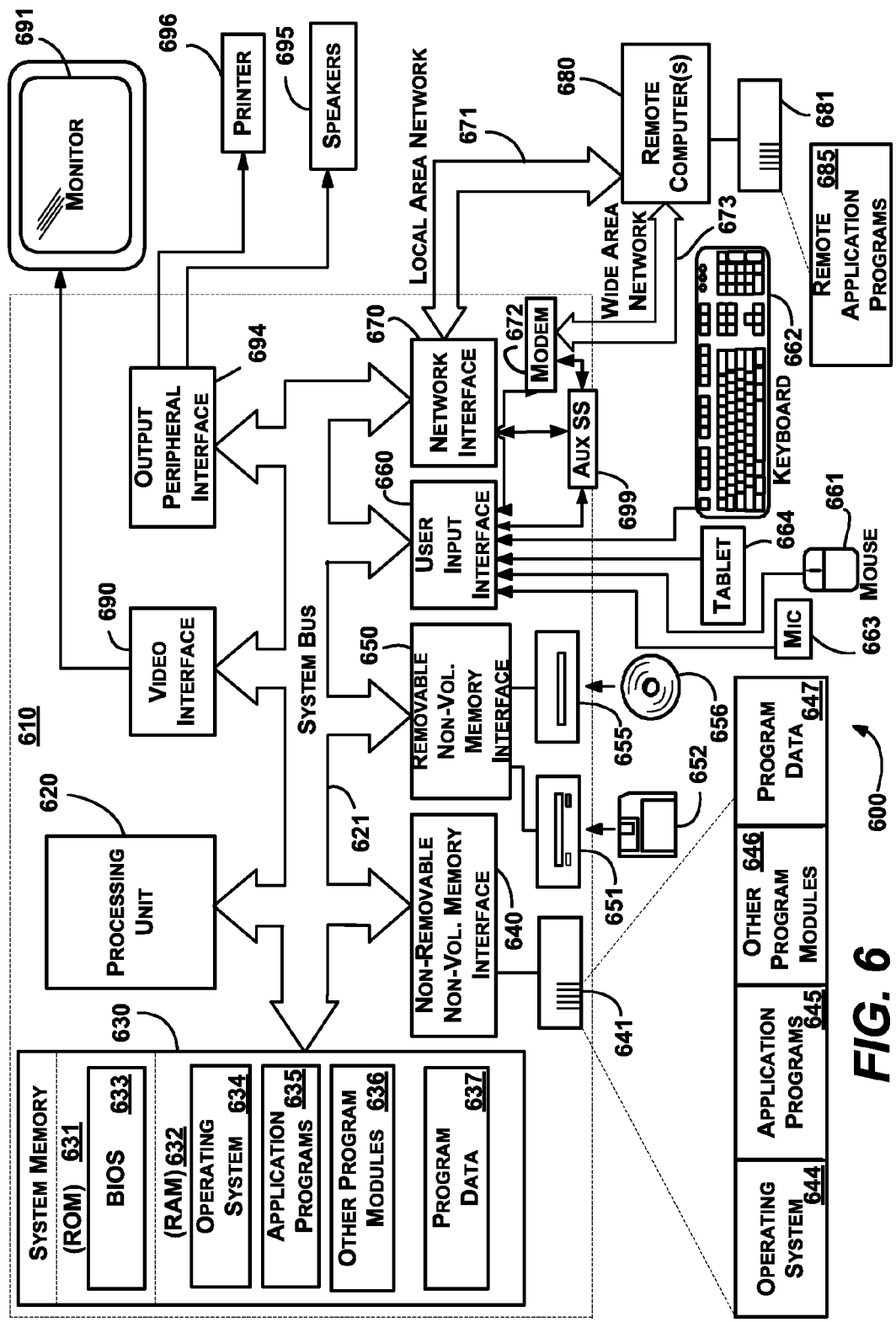
FIG. 6 shows an illustrative example of a computing environment into which various aspects of the present invention may be incorporated.

FIG. 6 illustrates an example of a suitable computing and networking environment 600 into which the examples and implementations of any of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a database engine environment, a method comprising, executing a first instruction of an expression against a plurality of data stacks until completed against each data stack, and executing a second instruction of the expression against the plurality of data stacks, in which for any given data stack, the first instruction completes executing against that data stack before the second instruction executes against that data stack.

2. The method of claim 1 wherein the first instruction completes executing against all data stacks of the plurality before the second instruction executes against any data stack.

3. The method of claim 1 further comprising, iterating to execute the first instruction through the data stacks before executing the second instruction.

4. The method of claim 1 further comprising receiving a parameter comprising a number of data stacks.

5. The method of claim 1 further comprising, loading source data into the data stacks.

6. The method of claim 5 further comprising receiving information corresponding to pointers to locations of the source data.

7. The method of claim 1 further comprising, loading each data stack with data of a database row, including loading the elements within each data stack with data from at least some of the columns of the database row that corresponds to that data stack.

8. The method of claim 1 further comprising, grouping data from different database rows into a data stack.

9. The method of claim 1 wherein the first and second instructions are part of a filtering expression, and wherein after executing the filtering expression against the data stacks, each data stack contains information as to whether that data stack met one or more filtering criteria.

10. In a computing environment, a system comprising, at least one processor, a memory communicatively coupled to the at least one processor and including components comprising: a database engine; an expression service of the database engine that evaluates and executes expressions, including an expression comprising a plurality of instructions, the expression service executing an expression by executing each instruction of the expression against a plurality of data stacks before executing another instruction against the plurality of data stacks.

11. The system of claim 10 wherein the expression service includes a mechanism that loads the data from a source database into the plurality of data stacks.

12. The system of claim 11 wherein the mechanism loads each data stack with data from one database row of the source database.

13. The system of claim 11 wherein the mechanism loads each data stack with data from different database rows of the source database.

14. The system of claim 10 wherein at least one instruction evaluates each of the data stacks against one or more filtering criteria.

15. One or more computer-readable hardware memories having computer-executable instructions, which when executed perform steps, comprising: (a) selecting a first instruction of a database expression as a selected expression; (b) selecting a first data stack as a selected data stack; (c) executing the selected expression against the selected data stack; (d) selecting a next data stack as the selected data stack and returning to step (c) until all data stacks have been selected; and (e) selecting a next instruction as the selected instruction and returning to step (b) until all instructions have been selected.

16. The one or more computer-readable hardware memories of claim 15 having further computer-executable instructions comprising, receiving data indicative of a total number of data stacks, and using that data in selecting the next data stack.

17. The one or more computer-readable hardware memories of claim 15 wherein executing the selected expression against the selected data stack loads data from a source database into the selected data stack.

18. The one or more computer-readable hardware memories of claim 15 wherein executing the selected expression against the selected data stack evaluates data in the selected data stack against one or more filtering criteria.

19. The one or more computer-readable hardware memories of claim 15 having further computer-executable instructions comprising loading the elements within each data stack with data from at least some of the columns of the database row that corresponds to that data stack.

20. The one or more computer-readable hardware memories of claim 15 having further computer-executable instructions comprising, grouping data from different database rows into a data stack.

* * * * *